United States Patent
Guim Bernat et al.

(10) Patent No.: US 12,493,429 B2
(45) Date of Patent: Dec. 9, 2025

(54) ENDURANCE HINTS FOR TIERED MEMORY

(71) Applicant: Intel Corporation, Santa Clara, CA (US)

(72) Inventors: Francesc Guim Bernat, Barcelona (ES); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/544,091

(22) Filed: Dec. 7, 2021

(65) Prior Publication Data

US 2022/0091782 A1   Mar. 24, 2022

(51) Int. Cl.
*G06F 3/00* (2006.01)
*G06F 3/06* (2006.01)
*G06F 12/0804* (2016.01)

(52) U.S. Cl.
CPC .......... *G06F 3/0656* (2013.01); *G06F 3/0604* (2013.01); *G06F 3/0679* (2013.01); *G06F 12/0804* (2013.01); *G06F 2212/7211* (2013.01)

(58) Field of Classification Search
CPC ......... G06F 2212/7211; G06F 12/0804; G06F 3/0656; G06F 3/0604
See application file for complete search history.

(56) References Cited

U.S. PATENT DOCUMENTS

| | | | |
|---|---|---|---|
| 9,798,472 B1* | 10/2017 | Natanzon | G06F 12/0804 |
| 2008/0183966 A1* | 7/2008 | Shim | G11C 16/3495 |
| | | | 711/E12.001 |
| 2018/0321945 A1* | 11/2018 | Benisty | G06F 15/76 |
| 2019/0384714 A1* | 12/2019 | Kaleeluddin | G06F 12/0891 |

* cited by examiner

*Primary Examiner* — Reginald G Bragdon
*Assistant Examiner* — Michael L Westbrook
(74) *Attorney, Agent, or Firm* — Essential Patents Group, LLP

(57) ABSTRACT

An embodiment of an electronic apparatus may include one or more substrates, and a controller coupled to the one or more substrates, the controller including circuitry to control access to persistent media, and manage an endurance of the persistent media based on one or more endurance hints from an external source. Other embodiments are disclosed and claimed.

18 Claims, 12 Drawing Sheets

ENDURANCE HINTS FOR TIERED MEMORY

BACKGROUND

A persistent memory device undergoes numerous program and erase (P/E) cycles over a lifetime of the device. Typically, the device is specified with some endurance that may be measured as a number of P/E cycles. Various techniques may be utilized to minimize wear and increase the lifetime of a persistent memory device, such as wear-leveling, garbage collection, over-provisioning, etc. Wear leveling techniques may average out the number of P/E cycles across all usable blocks in a persistent device to minimize frequent P/E cycling of the same blocks.

A directive or pragma (e.g., short for pragmatic) refers to a language construct for computer programming that indicates how a compiler should process its input. Pragmas may vary between compilers, and generally are not part of the actual grammar of the programming language. In some cases, pragmas may be handled by a preprocessor rather than the compiler.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
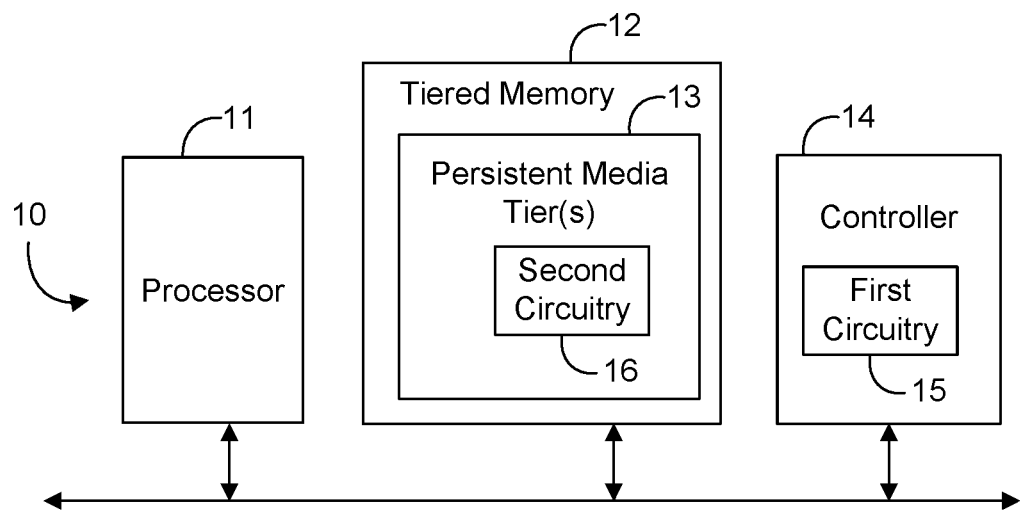
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM).

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

Some embodiments may advantageously provide technology for hints for improving wear-leveling in tiered memories and storage (e.g., software (SW) compiler drive hints, tiered memory controller hints, etc.). Storage class memories (SCM) have emerged as a key component in a tiered memory system. For example, a tiered memory may have a memory hierarchy where memory with the fastest speed and highest cost per bit (e.g., latches, registers, SRAM, DRAM, etc.) is at one end of the hierarchy while memory/storage with the highest capacity and lowest cost per bit is at an opposite end of the hierarchy (e.g., solid-state memory, hard disk drive (HDD) storage, cold storage, etc.). SCM may be positioned somewhere in the middle of the memory hierarchy, with reasonable access speeds and moderate cost per bit.

A variety of SCMs may find beneficial application in the memory hierarchy. For example, 3D crosspoint technology may be utilized in various memory and disk form factors that are suitable for SCM. Some SCM devices may require or benefit from wear-leveling because the materials used for the SCM may have limited endurance. While wear leveling can mitigate the endurance problem to a large extent, there may be a trade-off between media/material quality for SCM for higher endurance, and cost. Further, the traffic pressure on materials increases significantly as one moves to the faster end of the memory hierarchy. To quantitatively illustrate this, the bandwidth requirements at various tiers span L1/L2/last-level-cache (LLC) which may be in the order of several 100s of GB/s or TB+/s, DRAM bandwidth may be few 100 GB/s, SCM memory tier may be 100+ GB/s, and SCM storage tier may be several 10s of GB/s, and the slower storage end of the memory hierarchy may span few to few 10 GB/s.

As compute grows in the platform, the bandwidth pressure increases, and memory hierarchies may become more common to meet the need for both capacity and bandwidth to applications (e.g., because DRAM may not scale in a cost effective manner to address all requirements). With the increase in bandwidth comes an increase in write pressure, and this results in stress on wear leveling and endurance. As SCM moves up the memory hierarchy, there may be more bandwidth pressure (e.g., consider a disk bandwidth of 3-4 GB/s as compared to memory bandwidth of 20-30 GB/s), and this in turn, puts pressure on the wear leveling mechanisms for endurance. Some embodiments may provide technology to improve wear leveling mechanisms in memory hierarchies, especially in cases when device lifetimes are in consideration due to endurance limits. Advantageously, embodiments may improve the trade-off between the wear leveling mechanisms and media quality, while keeping costs low.

Wear leveling technology may leverage the fact that a small percentage of memory references can cause significant pressure on memory media, and tries to make sure that there is distribution of this pressure across the address space, so that a subset of memory locations do not render the memory device unusable, or with less capacity than advertised. However, the focus of wear leveling mechanisms is to distribute the non-linear traffic that arrives at the device, as opposed to reduce amount of traffic in itself. To reduce impact on device lifetime, some embodiments may leverage read-write equivalence and non-linearity in locations that are accessed. Read-write equivalence may vary for different materials, but an example read-write equivalence may be 100:1 in PCM media. This means that for a given location, it takes 100 reads to have the same (negative) impact on endurance as a single write. With respect to non-linearity in locations that are accessed, a small percentage of addresses (writes to those) may be responsible for wear leveling issues. For an example NoSQL workload, less than 1% of the address space may contain up to 20% of references, and less than 10% of the address space may contain as much as 60-80% of the references. While in some cases with a LLC-memory-disk layering, anything beyond LLC capacity cannot be contained in the LLC, this is not the case with memory hierarchies.

Some embodiments provide technology to leverage memory hierarchies to control and contain pressure on wear leveling for SCMs in the memory subsystem. For example, application SW may be aware of data structures that may cause a significant amount of write pressure. Such data structures include lock variables, for example, or locations that are written to in a loop. If the data structures span addresses that do not fit in the LLC, the data structures are sent to the memory hierarchy, and can cause significant pressure. For example, a matrix operation (e.g., a tiling matrix operations) may be configured so that the operation fits in a certain level in the memory hierarchy for performance reasons. When it comes to endurance, however, such performance optimization is not necessarily aligned with endurance optimization.

In some embodiments, compiler techniques and/or user-provided hints such as pragmas, coupled with SW and HW telemetry, may advantageously be leveraged to optimize for endurance-prioritized placements of structures in the memory hierarchy. For example, a memory hierarchy may include a DRAM tier, a first SCM tier (SCM-1), and a second SCM tier (SCM-2). In one example where a matrix must fit in SCM-2 and has heavy writes, some embodiments may skip SCM-1, from a caching perspective, to avoid replication of the write pressure on SCM-1. In a different scenario, if x% of references are responsible for most of the writes, then while considering eviction from DRAM for example, dirty line eviction within an associative set may be deprioritized by some embodiments for ranges that belong to the x% for which the memory controller has awareness, with regard to belonging to the references that are going to create the most write pressure.

In another example, some embodiment may consider pinning based on endurance. For example, in a flat usage like app direct, HW/SW based on hints, may choose to pin certain write-heavy (e.g., but not-performance critical) structures, such as statistic-gathering structures that are constantly updated in DRAM for endurance considerations (e.g., in contrast to for performance considerations, where these structures may have gone on SCM). In another example, some embodiments may provide feed-forward technology. For example, if there are some dual-inline memory modules (DIMMs) or devices with higher overall wear leveling counts than others, the platform can make choices to do re-mapping at a virtual to physical memory level, to not place known endurance-heavy structures in address ranges that correspond to already-almost-worn out DIMMs or devices.

With reference to FIG. 1, an embodiment of an electronic system 10 may include a processor 11, a tiered memory 12 that includes one or more tiers 13 of persistent media, and a controller 14 communicatively coupled to the processor 11 and the tiered memory 12. The controller 14 may include first circuitry 15 to control access to the tiered memory 12, and provide one or more endurance hints to the one or more tiers 13 of persistent media. For example, the endurance hint may identify an address range and an access mode. In some embodiments, at least one tier of the one or more tiers 13 of persistent media includes second circuitry 16 to manage an endurance of the at least one tier based on the address range and the access mode identified by the endurance hint. For example, the second circuitry 16 may be configured to delay a write-back to media at the address range identified by the endurance hint.

In some embodiments, the processor 11 may be configured to determine an endurance hint for the one or more tiers 13 of persistent media. For example, the processor 11 may be configured to determine the endurance hint based on an endurance-hint instruction. In some embodiments, the first circuitry 15 may also be configured to monitor memory traffic for the tiered memory 12, and determine an endurance hint for the one or more tiers 13 of persistent media based on an analysis of the monitored memory traffic.

Embodiments of each of the above processor 11, tiered memory 12, controller 14, first circuitry 15, second circuitry 16, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 and/or controller 14 may include a general purpose controller, a special purpose controller, a memory controller, a storage controller, a micro-controller, a general purpose processor, a special purpose processor, a central processor unit (CPU), an execution unit, etc. In some embodiments, portions of the tiered memory 12, the controller 14, the first circuitry 15, the second circuitry 16, and/or other system memory may be located in, or co-located with, various components, including the processor 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the tiered memory 12, other persistent media, or other system memory may store a set of instructions which when executed by the processor 11 and/or the controller 14 cause the system 10 to implement one or more components, features, or aspects of the system 10 (e.g., the first circuitry 15, controlling access to the tiered memory 12, providing one or more endurance hints, etc.).

Figure 2:
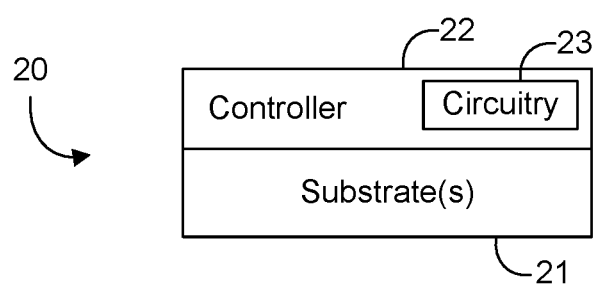
FIG. 2 is a block diagram of an example of an electronic apparatus according to an embodiment.

Turning now to FIG. 2, an embodiment of an electronic apparatus 20 may include one or more substrates 21, and a controller 22 coupled to the one or more substrates 21. The controller 22 may include circuitry 23 to control access to persistent media, and manage an endurance of the persistent media based on one or more endurance hints from an external source (e.g., external to the controller and the persistent media). For example, the circuitry 23 may be configured to delay a write-back to the persistent media based on an endurance hint. In some embodiments, the circuitry 23 may be further configured to provide an interface to receive the one or more endurance hints from the external source.

In some embodiments, an endurance hint may identify an address range and an access mode, and the circuitry 23 may be configured to provide relatively more priority to buffer access requests to the address range identified by the endurance hint (e.g., priority for buffer access requests within the address range identified by the endurance hint is set to be greater than access requests not in the identified address range). Additionally, or alternatively, the circuitry 23 may be configured to provide relatively more priority to cache lines that are pending to be flushed that belong to the address range identified by the endurance hint. In some embodiments, the circuitry 23 may also be configured to host the address range identified by the endurance hint on a scratchpad memory.

Embodiments of the circuitry 23 may be implemented in a system, apparatus, computer, device, etc., for example, such as those described herein. More particularly, hardware implementations of the circuitry 23 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 23 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the circuitry 23 may be implemented on a semiconductor apparatus, which may include the one or more substrates 21, with the circuitry 23 coupled to the one or more substrates 21. In some embodiments, the circuitry 23 may be at least partly implemented in one or more of configurable logic and fixed-functionality hardware logic on semiconductor substrate(s) (e.g., silicon, sapphire, gallium-arsenide, etc.). For example, the circuitry 23 may include a transistor array and/or other integrated circuit components coupled to the substrate(s) 21 with transistor channel regions that are positioned within the substrate(s) 21. The interface between the circuitry 23 and the substrate(s) 21 may not be an abrupt junction. The circuitry 23 may also be considered to include an epitaxial layer that is grown on an initial wafer of the substrate(s) 21.

Figure 3:
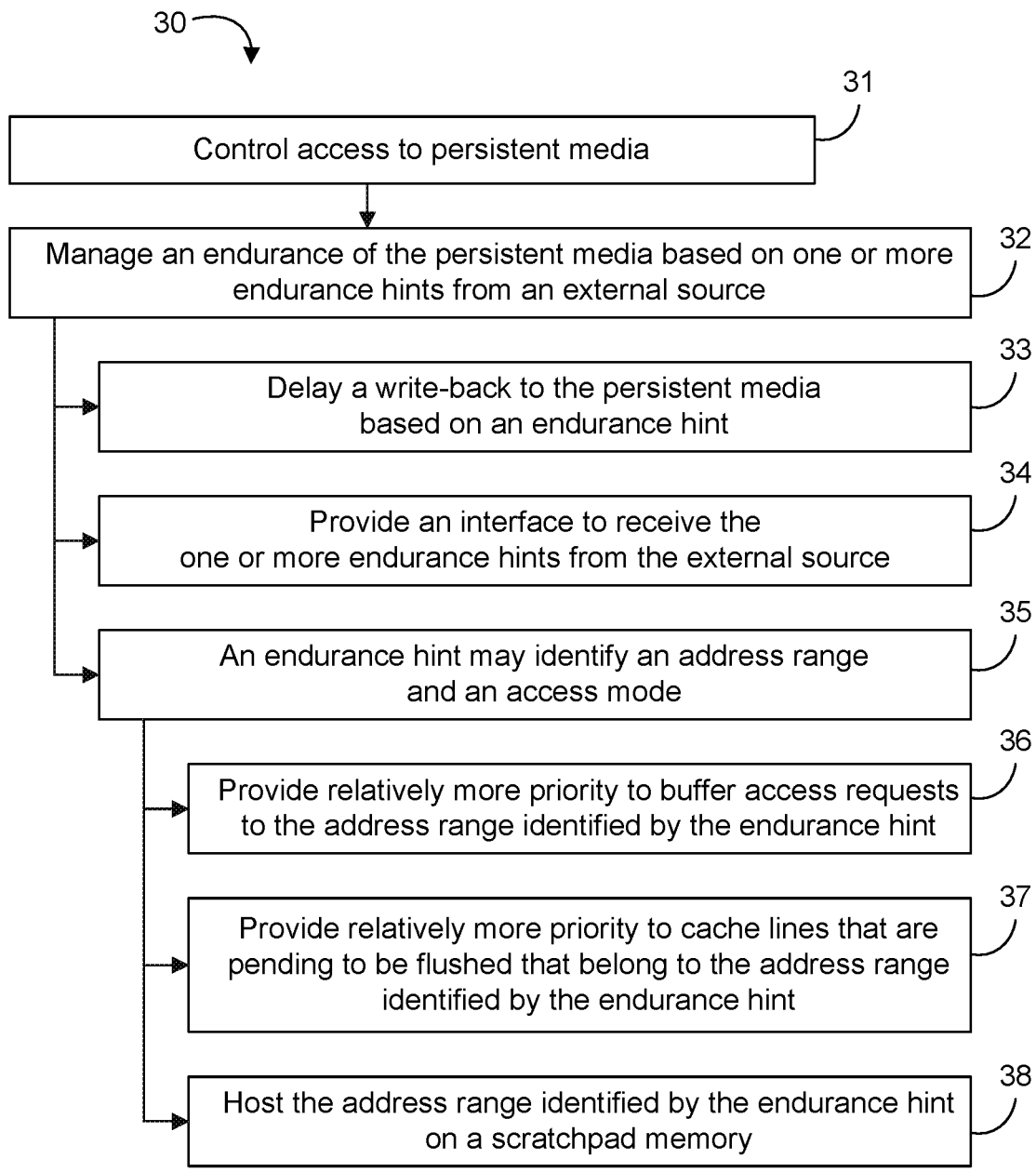
FIG. 3 is a flowchart of an example of a method of controlling memory according to an embodiment.

Turning now to FIG. 3, an embodiment of a method 30 of controlling memory may include controlling access to persistent media at box 31, and managing an endurance of the persistent media based on one or more endurance hints from an external source at box 32. For example, the method 30 may include delaying a write-back to the persistent media based on an endurance hint at box 33, and/or providing an interface to receive the one or more endurance hints from the external source at box 34.

In some embodiments, an endurance hint may identify an address range and an access mode at box 35, and the method 30 may further include providing relatively more priority to buffer access requests to the address range identified by the endurance hint at box 36. Additionally, or alternatively, the method 30 may also include providing relatively more priority to cache lines that are pending to be flushed that belong to the address range identified by the endurance hint at box 37, and/or hosting the address range identified by the endurance hint on a scratchpad memory at box 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, Course-Grained Reconfigurable Fabric (CGRA), or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 22 to 28 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
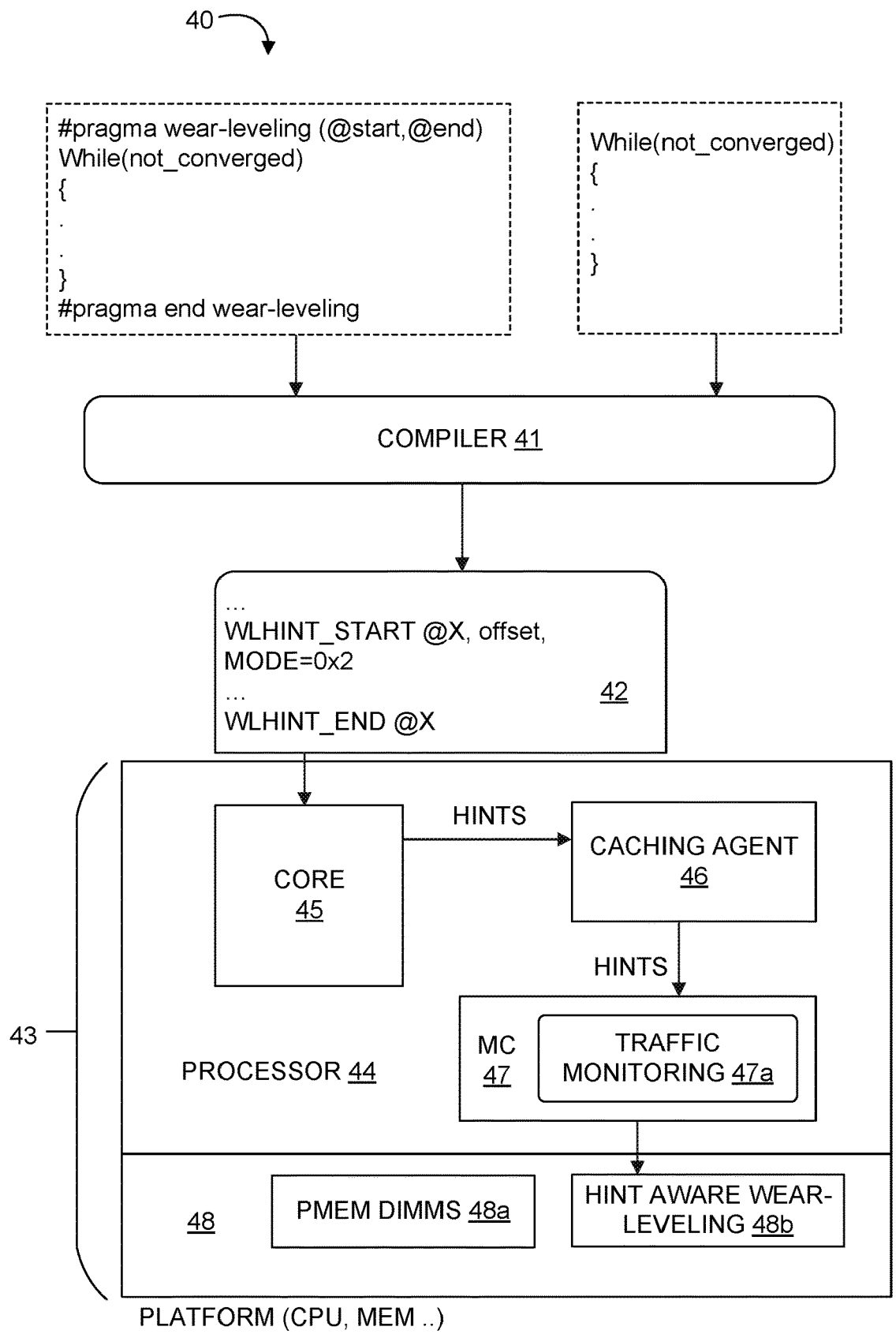
FIG. 4 is a block diagram of an example of a compute system according to an embodiment.

With reference to FIG. 4, an embodiment of a compute system 40 includes a compiler 41 that produces code 42 to run on a platform 43. The platform 43 includes a processor 44 (e.g., with one or more cores 45), a caching agent 46, a memory controller (MC) 47, and a memory system 48, coupled as shown. For example, the MC 47 includes a traffic monitoring module 47a. For example, the memory system 48 includes one or more persistent memory (PMEM) DIMMs 48a and a hint-aware wear-leveling module 48b. Embodiments of the system 40 provide technology for SW stacks to allow providing hints to the memory hierarchy in order to optimize the life of memories (e.g., DIMMs 48a) that are affected by certain type of traffics (e.g., wear-leveling, etc.). As shown in FIG. 4, the processor 44 includes technology to provide a new endurance-hint instruction or API that allows the software stack to provide hints that a particular memory range is going to be accessed frequently in a particular mode over a period of time (e.g., such technology may include a new instruction as part of an instruction set architecture (ISA)). For example, the hints may be implemented by either programmability (e.g. pragmas), or by the compiler 41, or both. The processor 44 (via caching agents 46 and/or the MC 47) implements a monitoring functionality that is configured to identify when certain memory ranges or memory lines are being access in certain pattern that implies frequent write backs to the next level of memory tier. The processor 44 further includes technology to translate both hints from the SW stack and hints from the caching agent 46 and MC 47 into hints that get provided into the rest of memory tiers (e.g., via the hint-aware wear-leveling module 48b). The hints provided from the processor 44 to the memory system 48 do not necessarily force any specific action, but represent extra external information that the persistent memory devices may consider when performing internal memory management operations.

As shown in FIG. 4, the memory hierarchies include technology in order to translate those external hints into actionable actions that can allow memory devices in the memory system 48 to enhance the lifetime of the memory media while providing the right level of memory performance In some embodiments, the persistent memory wear-leveling logic may be configured to utilize the external hints in order to delay as much as possible the actual write-backs. Embodiments may advantageously improve or optimize the life time of those memories with a lifetime that is affected by actual memory patterns. Although examples are provided herein in connection with persistent memory technology, any memory technology that has a similar trade-off may make beneficial use of the various embodiments. Embodiments may likewise be useful for storage devices with persistent memory or other similarly affected memory technologies.

Figure 5:
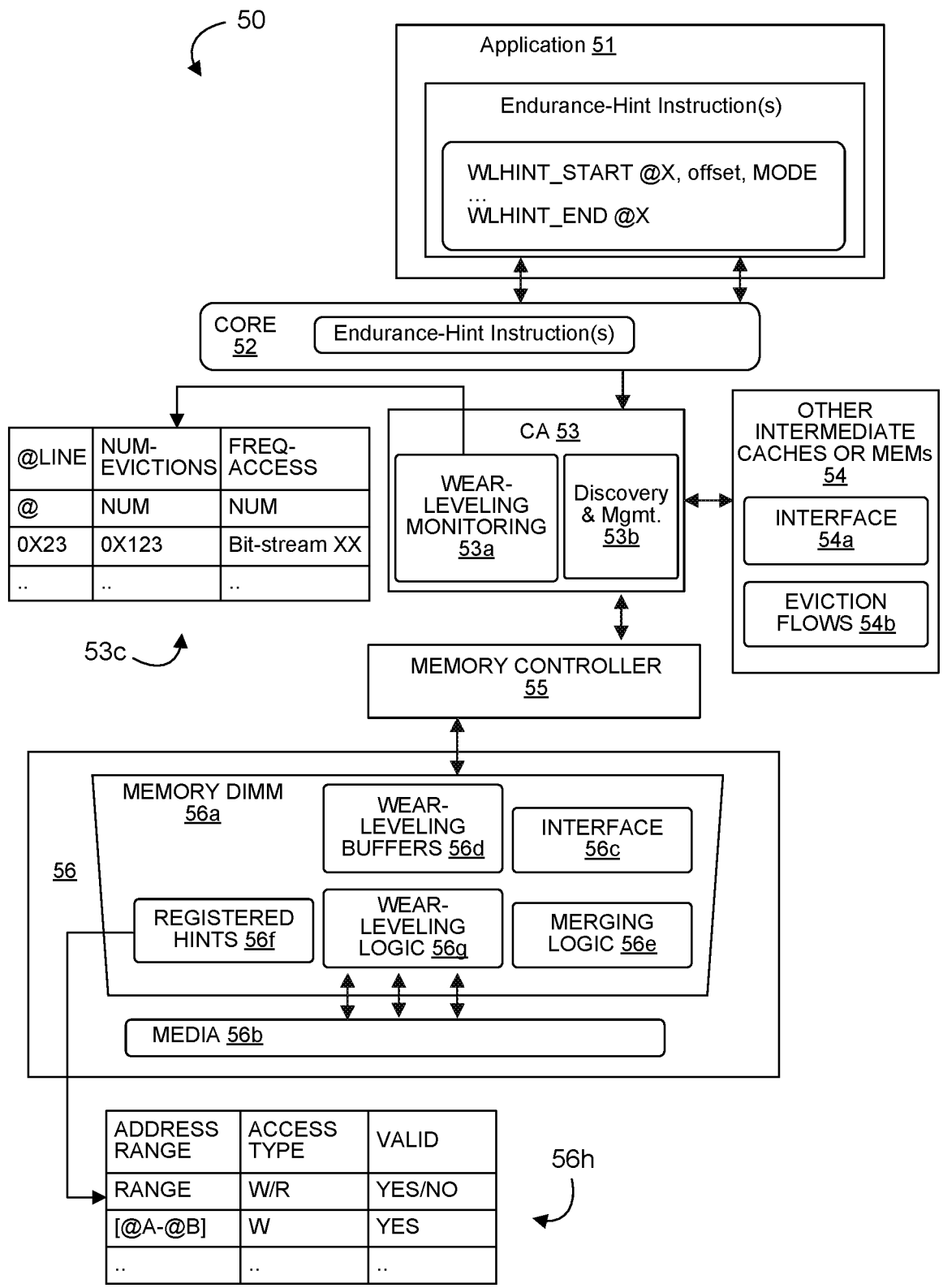
FIG. 5 is a block diagram of another example of a compute system according to an embodiment.

With reference to FIG. 5, an embodiment of a compute system 50 includes an application 51 that includes one or more endurance-hint instructions (e.g., WLHINT_START, WLHINT_END, as described in further detail below) and a core 52 configured to execute the one or more endurance-hint instructions. The system 50 further includes a caching agent (CA) 53 coupled to one or more intermediate caches or memories 54. As shown in FIG. 5, the CA 53 includes a wear-leveling monitoring module 53a and a discovery and management module 53b. The intermediate caches or memories 54 include an interface 54a (e.g., configured to process endurance hints) and an eviction flows module 54b (e.g., configured to adapt the eviction policies based on the endurance hints). The system 50 further includes a memory controller 55 coupled to a tiered memory system 56 that includes at least one tier 56a with media 56b that benefits from endurance management. As shown in FIG. 5, the tier 56a comprises a memory DIMM with an interface 56c (e.g., configured to process endurance hints), wear-leveling buffers 56d, merging logic 56e, registered hints 56f, and wear-leveling logic 56g (e.g., configured to adapt wear-leveling of the media 56b based on endurance hints).

As shown in FIG. 5, the processor/core 52 include decode/execution technology configured to provide endurance-hints instructions (e.g., or an API) that allows the software stack (e.g., including the application 51) to provide hints that a particular memory range is going to be accessed frequently in a particular mode over a period of time. The endurance-hint instructions may be implemented either by programmability (e.g. pragmas), or by compiler, or both. Two example endurance-hints instructions include a WLHINT_START instruction and a WLHINT_END instruction. The WLHINT_START instruction provides a hint that an address range will be accessed heavily in a specific mode. An example format is: WLHINT_START <@X>, <offset>, <units>, <MODE>; where <@X> provides that baseline of the address range that the software stack is expected to start accessing frequently in a particular mode, <offset> indicates the length of the actual memory range (e.g., which may be specified in different units such as MB, etc.), <units> provides the actual unit size the offset, and <MODE> indicates whether the range will be accessed in read, write or read/write mode.

The WLHINT_END instruction provides a hint that the active access to that memory range is not going happen anymore. An example format is as follows: WLHINT_END <@X>; where <@X> provides the baseline of the address range that the software stack previously provided an endurance hint.

Embodiments of a processor (e.g., via the CA 53 and/or memory controller 55) implements a monitoring functionality that identifies when certain memory ranges or memory lines are being access in certain patterns that imply frequent write backs to the next level of memory tier. In some embodiments, all or portions of the monitoring may be col-located with caching agents (e.g., that are responsible to manage the coherency access to memory lines across the whole system) such as the CA 53. For example, the CA 53 include the wear-leveling monitoring module 53a that includes monitoring logic that is configured to monitor/store the actual memory address being evicted and who owns that line (e.g. via process address ID) every time that a memory line is evicted to memory caches. For example, the CA 53 may maintain a data structure 53c that monitors the eviction rate for the more frequently access memory ranges. For example, the data structure 53c may include N entries that host the following information: 1) evictions that have occurred for a particular memory range (e.g., the size of the monitored memory range (e.g., 4 KB or 1 KB or less) may be configured or adaptively identified); and 2) a current monitoring time interval (e.g., the interval may be used with the eviction information to compute the frequency into another field of the data structure 53c).

When a new eviction is informed by the monitoring logic, the data structure 53c is searched to determine if the address is part of a memory range that is being monitored. In the positive case, the number of evictions field of the data structure 53c is increased. If the eviction rate passed a certain threshold, the monitoring logic will provide a hint to the following memory tiers that a frequently accessed memory range in write mode has been identified. In the negative case, the monitoring logic will evict the monitoring entry that has less frequent access. In some embodiments, the frequency rate is recomputed every N units of time. The monitoring logic may be implemented in any suitable location within a processor (e.g., in the CA 53, as shown in FIG. 5, the MC 47, as shown in FIG. 4, etc.) or in another circuit or module outside the processor.

The processor includes technology to translate hints from the endurance-hint instructions and the CA 53 into endurance hints that get provided into the rest of memory tiers (e.g., as potentially useful external information, and not necessarily to force any specific action).

As shown in FIG. 5, hints generated by endurance-hint instructions go from the core 52 to the CA 53 and hints may also be generated within the CA 53. The CA 53 is configured to identify what memory controllers are managing the various memory lines that belong to the hinted address range (e.g., in the case of interleaving the hinted address range may affect multiple DIMMS), and to send the hint into each memory controller that manages the respective memory ranges.

One or more memory devices in the memory hierarchy (e.g., with media that benefits from endurance management) include technology to translate endurance hints into actionable actions that may enhance the lifetime of the memory media while providing the right level of memory performance. In some embodiments, as shown in FIG. 5, a memory device 56a may expand its wear-leveling logic 56g in order to provide more priorities to stay on buffering or caching lines that are pending to be flushed to media that belong to an active range as indicated by the registered hints 56f. For example, the registered hints 56f may include a data structure 56h that maintains a set of entries where each entry includes fields for an address range, an access type, and a valid indication. When write arrives for a particular address, the wear leveling logic 56g checks if the address belongs to an active range in the data structure 56h (e.g., the address falls within a range of one of the entries and the valid field indicates that the range is valid). If the address does not belong to an active range, the write will be included in the buffer 56d and potentially be written into the media 56b immediately. In the affirmative case, the wear-leveling logic 56g may consolidate the write with an existing write for the same address that is hosted into the buffer 56d for the same address. In the case that there is no line, the wear-leveling logic 56g may decide to push one write to the media 56b and store the write in the buffer 56d, depending on the eviction policy and the status of the monitored ranges.

Figure 6:
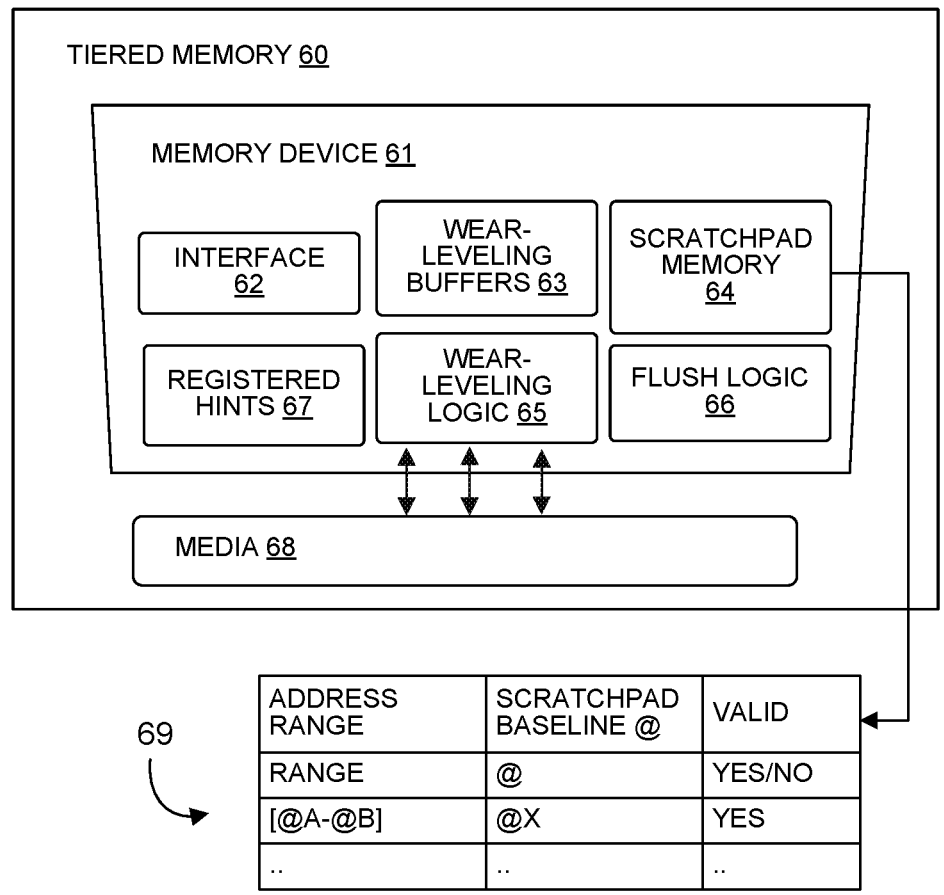
FIG. 6 is a block diagram of an example of a tiered memory according to an embodiment.

With reference to FIG. 6, an embodiment of a tiered memory 60 may include a memory device 61 (e.g., a DIMM) that comprises an interface 62 (e.g., that supports endurance hints), wear-leveling buffers 63, scratchpad memory 64, wear-leveling logic 65, flush logic 66, registered hints 67, and media 68. The scratchpad memory 64 may store a data structure 69 that maintains a set of entries where each entry includes fields for an address range, a scratchpad base address, and a valid indication. The memory device 61 may implement endurance hints with the scratchpad memory 64 to host the memory ranges accessed frequently and flush them afterwards to the media 68. Preferably, the scratchpad memory 64 include persistent memory (e.g., nonvolatile memory, battery-backed volatile memory, etc.) in order to avoid losing data in case of a power outage. Although embodiments have been described in connection with an expansion in wear-leveling logic (e.g., for persistent memory) in order to delay the actual write-backs (e.g., to the extent possible or practical), other embodiments may be implemented for other types of access that may have different endurance implications into the media (e.g., which may be implemented in other circuits or logic of the memory device).

Figure 7:
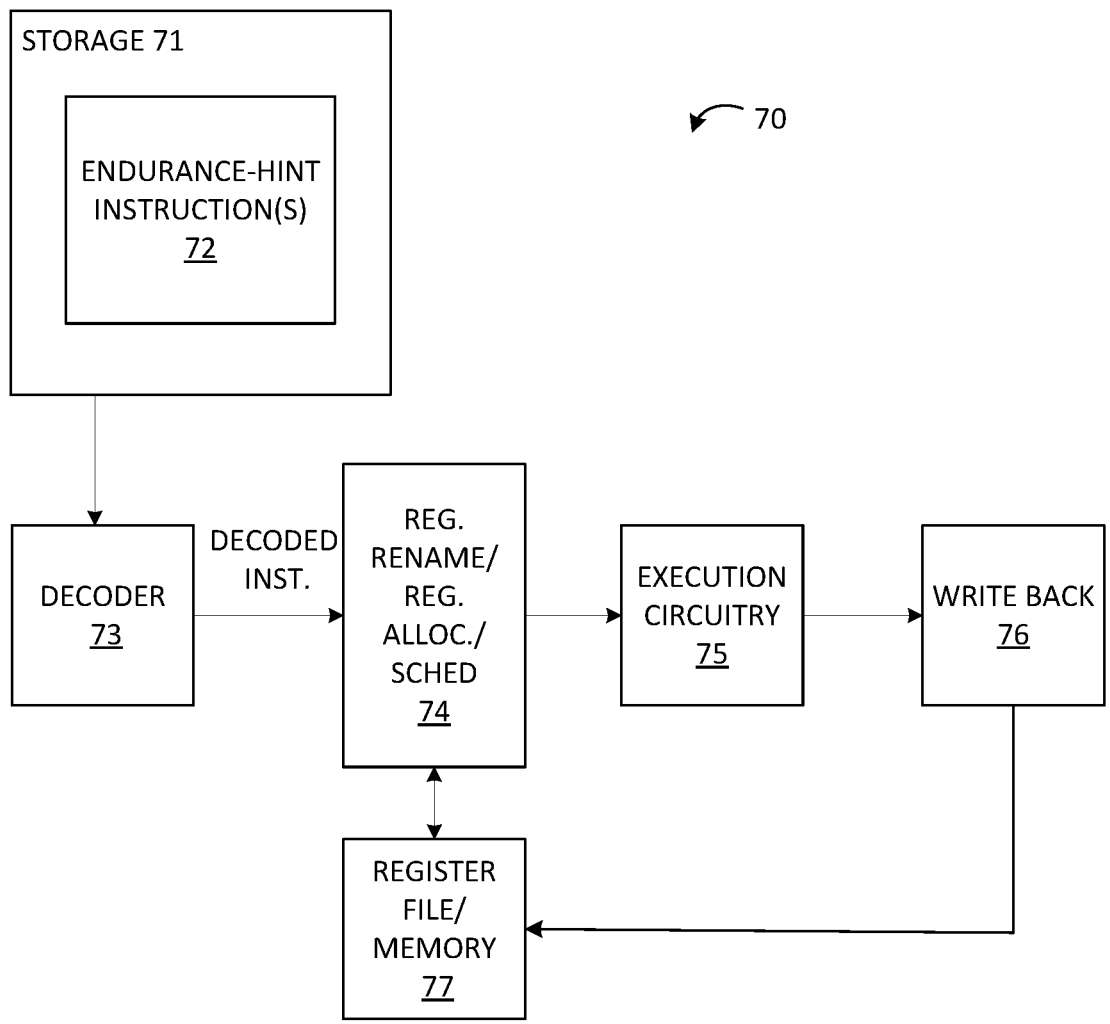
FIG. 7 is a block diagram of an example of hardware according to an embodiment.

FIG. 7 illustrates an embodiment of hardware 70 to process instructions such as endurance-hint instructions (e.g., WLHINT_START, WLHINT_END, etc.). As illustrated, storage 71 stores one or more endurance-hint instructions 72 to be executed. Decode circuitry 73 may be configured to decode a single instruction, the single instruction to include a field for an opcode, and execution circuitry 75 to execute the decoded instruction according to the opcode.

One of the endurance-hint instructions 72 is received by decode circuitry 73. For example, the decode circuitry 73 receives this instruction from fetch logic/circuitry. The instruction includes fields for an opcode, one or more sources, and optionally one or more destinations. In some embodiments, the source(s) and destination(s) are registers, and in other embodiments one or more are memory locations. In some embodiments, the opcode details which endurance hint operation is to be performed.

The decode circuitry 73 decodes the instruction into one or more operations. In some embodiments, this decoding includes generating a plurality of micro-operations to be performed by execution circuitry (such as execution circuitry 75). The decode circuitry 73 also decodes instruction prefixes.

In some embodiments, register renaming, register allocation, and/or scheduling circuitry 74 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 77 store data as operands of the instruction to be operated on by execution circuitry 75. Exemplary register types include packed data registers, general purpose registers, and floating point registers.

Figure 12:
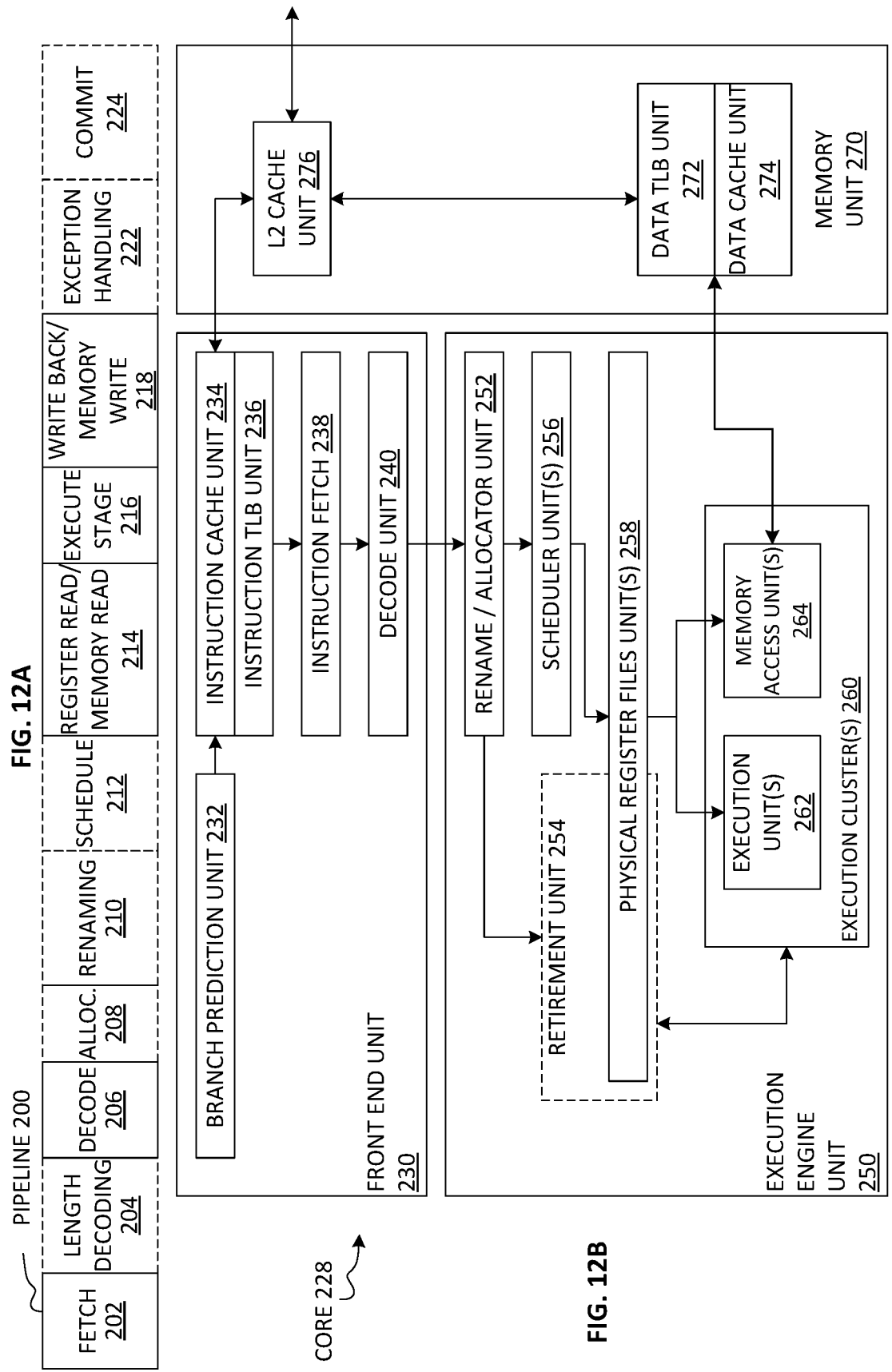
FIG. 12A is a block diagram illustrating both an exemplary in-order pipeline and an exemplary register renaming, out-of-order issue/execution pipeline according to embodiments.
FIG. 12B is a block diagram illustrating both an exemplary embodiment of an in-order architecture core and an exemplary register renaming, out-of-order issue/execution architecture core to be included in a processor according to embodiments.

Execution circuitry 75 executes the decoded instruction. Exemplary detailed execution circuitry is shown in FIG. 12B, etc. The execution of the decoded instruction causes the execution circuitry 75 to execute the decoded instruction according to the opcode. For some endurance-hint instructions, for example, the execution of the decoded instruction causes the execution circuitry 75 to provide an endurance hint (e.g., an indication of an address range that may be frequently accessed) to hardware and/or software that supports the endurance hints(s). In some embodiments, the opcode intrinsically specifies the endurance hint. Alternatively, or additionally, the execution circuitry 75 may be further caused to execute the decoded instruction according to the endurance-hint instruction opcode to store information in a register (e.g., a MSR) that corresponds to the endurance hint.

In some embodiments, the single instruction further includes a field for an identifier of one or more source operands, and the execution circuitry 75 is further to execute the decoded instruction according to the opcode to retrieve source information from one or more locations indicated by the source operands, and to provide the endurance hint in accordance with the retrieved information. For example, the execution circuitry 75 may be further to execute the decoded instruction according to the opcode to provide a hint that an address range indicated by the one or more source operands will be accessed frequently in a mode indicated by the one or more source operands. In some embodiments, the execution circuitry 75 is further to execute the decoded instruction according to the opcode to provide a hint that frequent access to an address range indicated by the one or more source operands is ended.

In some embodiments, retirement/write back circuitry 76 architecturally commits the destination register into the registers or memory 77 and retires the instruction.

Figure 8:
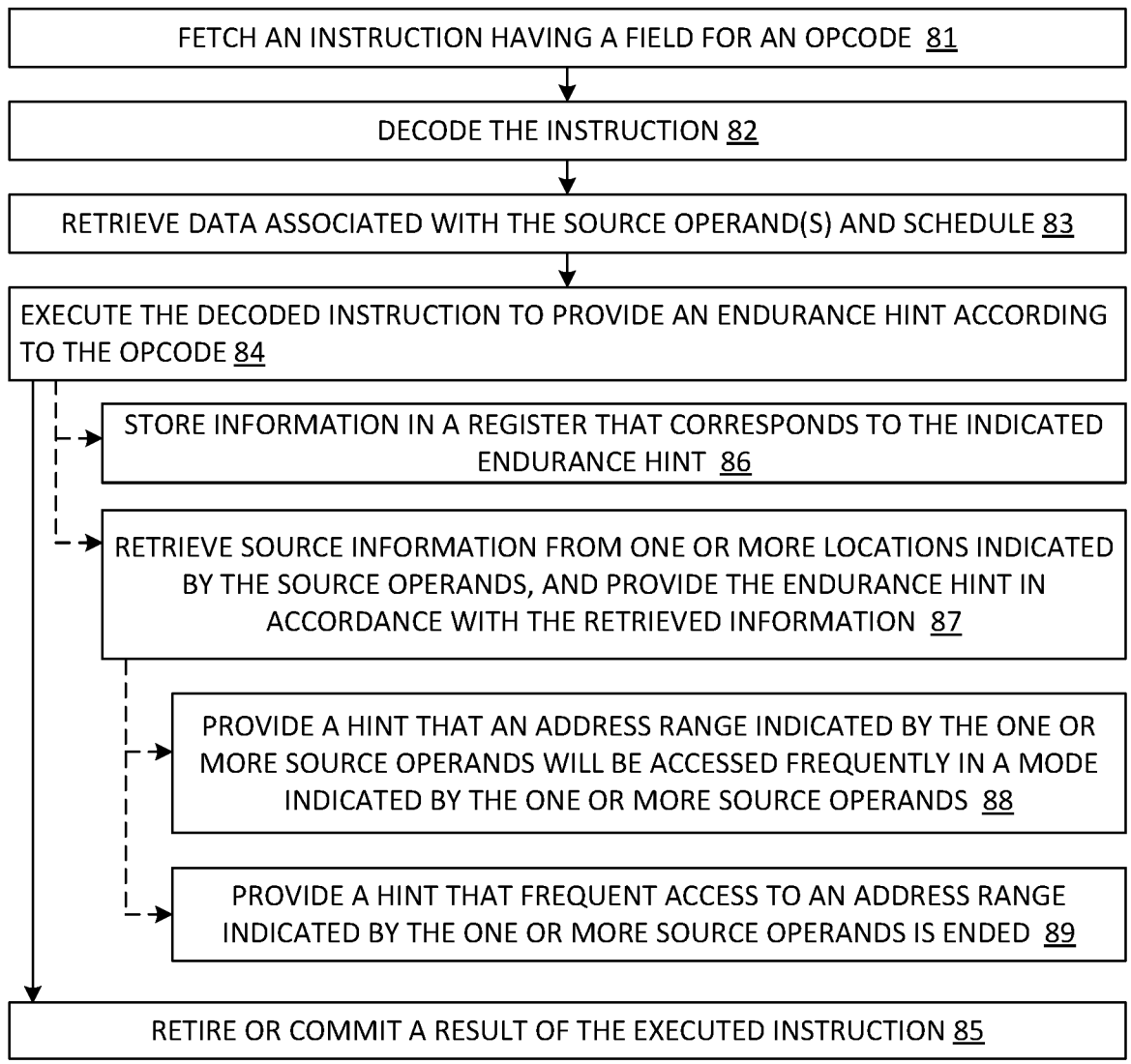
FIG. 8 is a flow diagram of an example of a method according to an embodiment.

FIG. 8 illustrates an embodiment of method 80 performed by a processor to process endurance-hint instructions. For example, a processor core as shown in FIG. 12B, a pipeline as detailed below, etc. performs this method.

At 81, an instruction is fetched. For example, an endurance-hint instruction is fetched. The endurance-hint instruction includes fields for one or more of an opcode, one or more source operands, and optionally one or more destination operands. In some embodiments, the instruction is fetched from an instruction cache. The source operand(s) and destination operand(s) are packed data. The opcode of the endurance-hint instruction indicates an endurance hint operation. The endurance-hint instruction may further indicate an address range and/or mode for the endurance hint operation.

The fetched instruction is decoded at 82. For example, the fetched endurance-hint instruction is decoded by decode circuitry such as that detailed herein.

Data values associated with the source operands of the decoded instruction are retrieved and execution of the decoded instruction is scheduled at 83. For example, when one or more of the source operands are memory operands, the data from the indicated memory location is retrieved.

At 84, the decoded instruction is executed by execution circuitry (hardware) such as that detailed herein. For an endurance-hint instruction, the execution will cause the execution circuitry to provide an endurance hint according to the opcode (e.g., an indicated address range and/or mode for hardware and/or software that supports the endurance hint(s)).

In some embodiments, the instruction is committed or retired at 85.

In some embodiments, the execution of the decoded endurance-hint instruction will cause execution circuitry to store information in a register that corresponds to the indicated endurance hint at 86. For example, the execution of the decoded endurance-hint instruction may cause execution circuitry to retrieve source information from one or more locations indicated by the source operands, and to provide the endurance hint in accordance with the retrieved information at 87. For example, execution of a decoded endurance-hint instruction according to a WLHINT_START opcode will cause execution circuitry to provide a hint that an address range indicated by the one or more source operands will be accessed frequently in a mode indicated by the one or more source operands at 88. In another example, execution of a decoded endurance-hint instruction according to a WLHINT_END opcode will cause execution circuitry to provide a hint that frequent access to an address range indicated by the one or more source operands is ended at 89.

Figure 9:
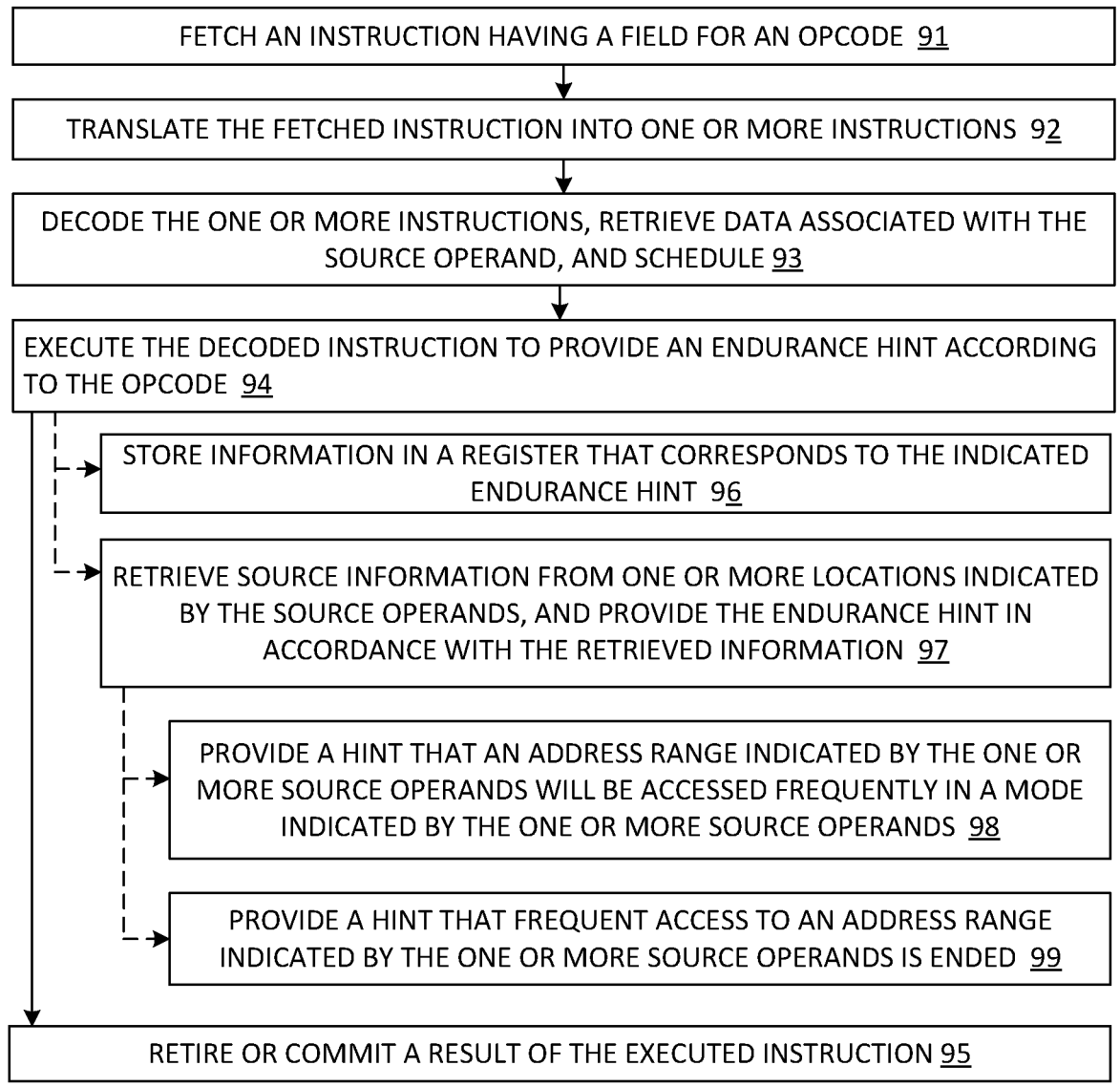
FIG. 9 is a flow diagram of another example of a method according to an embodiment.

FIG. 9 illustrates an embodiment of method 90 performed by a processor to process an endurance-hint instruction using emulation or binary translation. For example, a processor core as shown in FIG. 12B, a pipeline as detailed below, etc. performs this method.

At 91, an instruction is fetched. For example, an endurance-hint instruction is fetched. The endurance-hint instruction includes fields for one or more of an opcode, one or more source operands, and optionally one or more destination operands. In some embodiments, the instruction is fetched from an instruction cache. The source operand(s) and destination operand(s) are packed data. The opcode of the endurance-hint instruction indicates an endurance hint operation. The endurance-hint instruction may further indicate an address range and/or mode for the endurance hint operation.

The fetched instruction of a first instruction set is translated into one or more instructions of a second instruction set at 92.

The one or more translated instructions of the second instruction set are decoded at 93. In some embodiments, the translation and decoding are merged. For example, the endurance-hint instruction is decoded by decode circuitry such as that detailed herein. Also at 93, data values associated with the source operands of the decoded instruction are retrieved, and execution of the decoded instruction is scheduled. For example, when one or more of the source operands are memory operands, the data from the indicated memory location is retrieved.

At 94, the decoded instruction is executed by execution circuitry (hardware) such as that detailed herein. For an endurance-hint instruction, the execution will cause the execution circuitry to provide an endurance hint according to the opcode (e.g., an indicated address range and/or mode for hardware and/or software that supports the endurance hint(s)).

In some embodiments, the instruction is committed or retired at 95.

In some embodiments, the execution of the decoded endurance-hint instruction will cause execution circuitry to store information in a register that corresponds to the indicated endurance hint at 96. For example, the execution of the decoded endurance-hint instruction may cause execution circuitry to retrieve source information from one or more locations indicated by the source operands, and to provide the endurance hint in accordance with the retrieved information at 97. For example, execution of a decoded endurance-hint instruction according to a WLHINT_START opcode will cause execution circuitry to provide a hint that an address range indicated by the one or more source operands will be accessed frequently in a mode indicated by the one or more source operands at 98. In another example, execution of a decoded endurance-hint instruction according to a WLHINT_END opcode will cause execution circuitry to provide a hint that frequent access to an address range indicated by the one or more source operands is ended at 99.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 10:
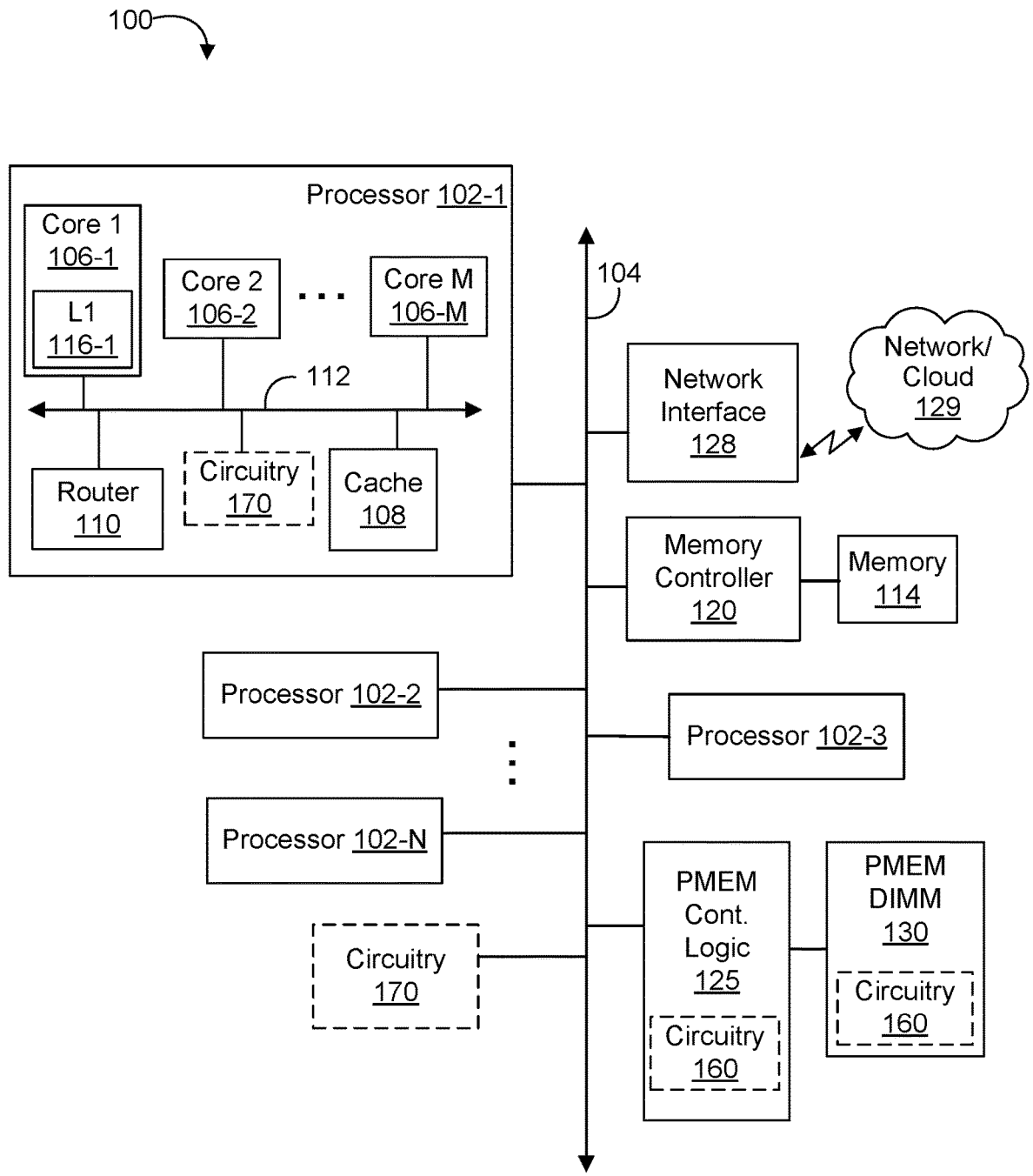
FIG. 10 is a block diagram of an example of a computing system according to an embodiment.

Turning now to FIG. 10, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 10, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 10, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a PMEM DIMM 130 coupled to the interconnect 104 via PMEM controller logic 125. Hence, logic 125 may control access by various components of system 100 to the PMEM DIMM 130. Furthermore, even though logic 125 is shown to be directly coupled to the interconnection 104 in FIG. 10, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 11) or provided on a same integrated circuit (IC) device in various embodiments (e.g., on the same circuit board device as the PMEM DIMM 130 or in the same enclosure as the PMEM DIMM 130).

Furthermore, logic 125 and/or PMEM DIMM 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, PMEM DIMM 130, DIMM bus, SATA bus, logic 125, circuitry 160, circuitry 170, etc., to sense variations in various factors affecting power/thermal behavior of the system/platform, such as temperature, operating frequency, operating voltage, power consumption, and/or inter-core communication activity, etc.

Figure 11:
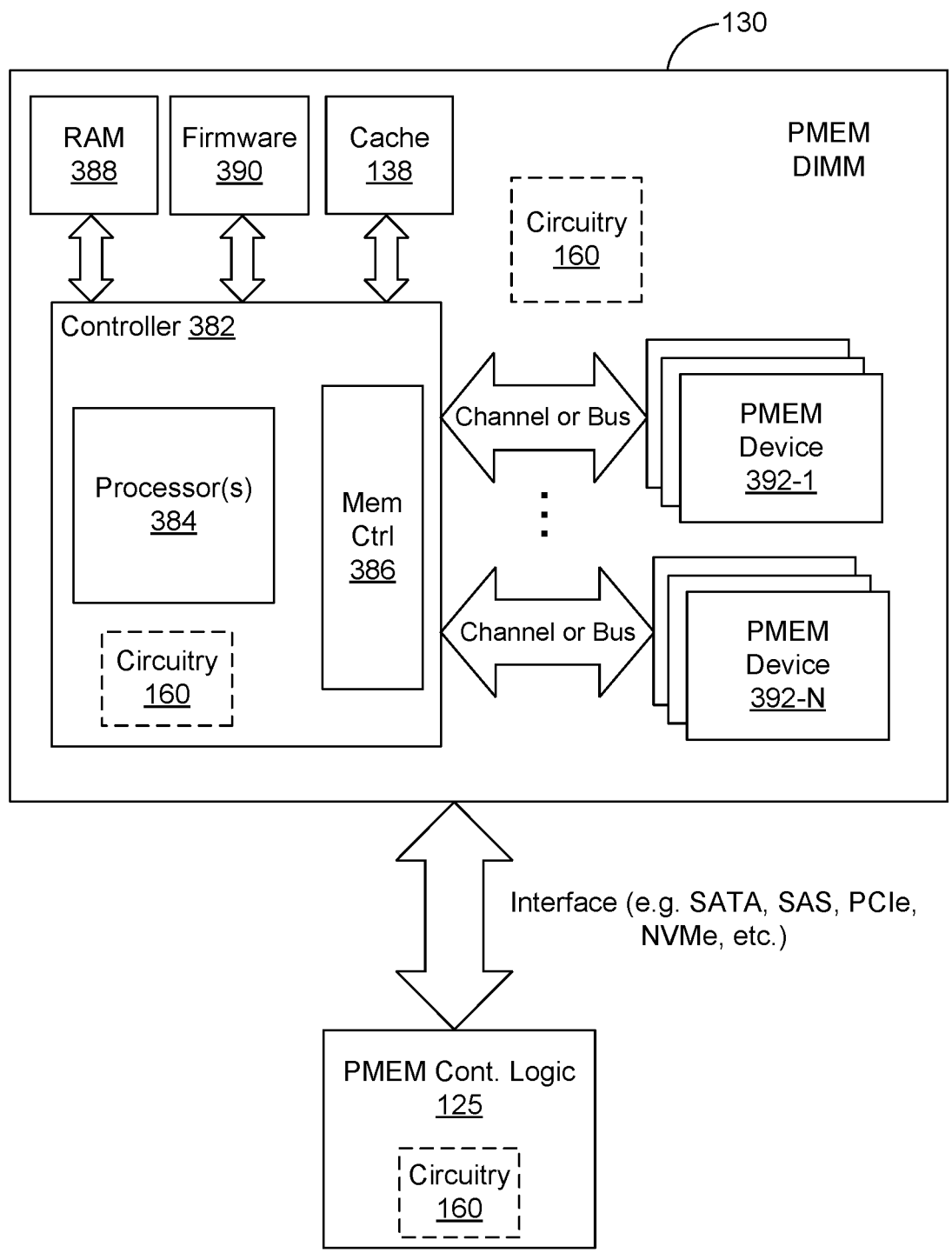
FIG. 11 is a block diagram of an example of a persistent memory device according to an embodiment.

FIG. 11 illustrates a block diagram of various components of the PMEM DIMM 130, according to an embodiment. As illustrated in FIG. 11, circuitry 160 may be located in various locations such as inside the PMEM DIMM 130 or controller 382, etc., and may include similar technology as discussed in connection with FIG. 10. The PMEM DIMM 130 includes a controller 382 (which in turn includes one or more processor cores or processors 384 and memory controller logic 386), cache 138, RAM 388, firmware storage 390, and one or more PMEM devices 392-1 to 392-N (collectively PMEM media 392). The PMEM media 392 is coupled to the memory controller logic 386 via one or more memory channels or busses. Also, PMEM DIMM 130 communicates with logic 125 via an interface (such as a SATA, SAS, PCIe, NVMe, etc., interface). Processors 384 and/or controller 382 may compress/decompress data written to or read from PMEM devices 392-1 to 392-N.

As illustrated in FIGS. 10 and 11, the PMEM DIMM 130 may include circuitry 160, which may be in the same enclosure as the PMEM DIMM 130 and/or fully integrated on a printed circuit board (PCB) of the PMEM DIMM 130. The system 100 further include circuitry 170 outside of the PMEM DIMM 130. One or more of the features/aspects/operations discussed with reference to FIGS. 1-9 may be performed by one or more of the components of FIGS. 10 and/or 11. Also, one or more of the features/aspects/operations of FIGS. 1-9 may be programmed into the firmware 390. Further, PMEM controller logic 125 may also include circuitry 160. Advantageously, the circuitry 160 and/or the circuitry 170 may include technology to implement one or more aspects of the system 10 (FIG. 1), the apparatus 20 (FIG. 2), the method 30 (FIG. 3), the system 40 (FIG. 4), the system 50 (FIG. 5), the memory 60 (FIG. 6), the hardware 70 (FIG. 7), the method 80 (FIG. 8), the method 90 (FIG. 9), and/or any of the features discussed herein. For example, the circuitry 160 may be configured to implement one or more of the memory device aspects of the various embodiments, while the circuitry 170 may be configured to implement one or more of the processor/core aspects of the various embodiments.

For example, the memory 114, the PMEM DIMM 130, and other memory/storage may be configured as a tiered memory, and the circuitry 170 may be configured to control access to the tiered memory, and provide one or more endurance hints to the PMEM DIMM 130. For example, the endurance hint may identify an address range and an access mode. In some embodiments, the circuitry 170 may be configured to manage an endurance of the PMEM DIMM 130 based on the address range and the access mode identified by the endurance hint. For example, the circuitry 170 may be configured to delay a write-back to the PMEM media 392 at the address range identified by the endurance hint.

In some embodiments, the processor(s) 102 may be configured to determine an endurance hint for the PMEM DIMM 130. For example, the processor(s) 102 may be configured to determine the endurance hint based on an endurance-hint instruction. In some embodiments, the circuitry 170 may also be configured to monitor memory traffic for the tiered memory, and to determine an endurance hint for the PMEM DIMM 130 based on an analysis of the monitored memory traffic.

In other embodiments, the PMEM DIMM may be replaced with any suitable storage/memory technology/media. In some embodiments, the circuitry 160 may be coupled to one or more substrates (e.g., silicon, sapphire, gallium arsenide, printed circuit board (PCB), etc.), and may include transistor channel regions that are positioned within the one or more substrates. In other embodiments, the PMEM DIMM 130 may include two or more types of storage media. The PMEM DIMM may alternatively, or additionally, include persistent volatile memory (e.g., battery or capacitor backed-up DRAM or SRAM). For example, the PMEM DIMM 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile PMEM media 392. The capacitors may act as backup batteries for the persistent volatile memory. As shown in FIGS. 10 and 11, features or aspects of the circuitry 160 may be distributed throughout the system 100, and/or co-located/integrated with various components of the system 100.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

FIG. 12B shows processor core 228 including a front end unit 230 coupled to an execution engine unit 250, and both are coupled to a memory unit 270. The core 228 may be a reduced instruction set computing (RISC) core, a complex instruction set computing (CISC) core, a very long instruction word (VLIW) core, or a hybrid or alternative core type. As yet another option, the core 228 may be a special-purpose core, such as, for example, a network or communication core, compression engine, coprocessor core, general purpose computing graphics processing unit (GPGPU) core, graphics core, or the like.

The front end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit 240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 228 includes a microcode ROM or other medium that stores microcode for certain macroinstructions (e.g., in decode unit 240 or otherwise within the front end unit 230). The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The scheduler unit(s) 256 represents any number of different schedulers, including reservations stations, central instruction window, etc. The scheduler unit(s) 256 is coupled to the physical register file(s) unit(s) 258. Each of the physical register file(s) unit(s) 258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit(s) 258 comprises a vector registers unit, a write mask registers unit, and a scalar registers unit. These register units may provide architectural vector registers, vector mask registers, and general purpose registers. The physical register file(s) unit(s) 258 is overlapped by the retirement unit 254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 254 and the physical register file(s) unit(s) 258 are coupled to the execution cluster(s) 260. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The instruction cache unit 234 is further coupled to a level 2 (L2) cache unit 276 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 238 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 228 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 228 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The program code described herein may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
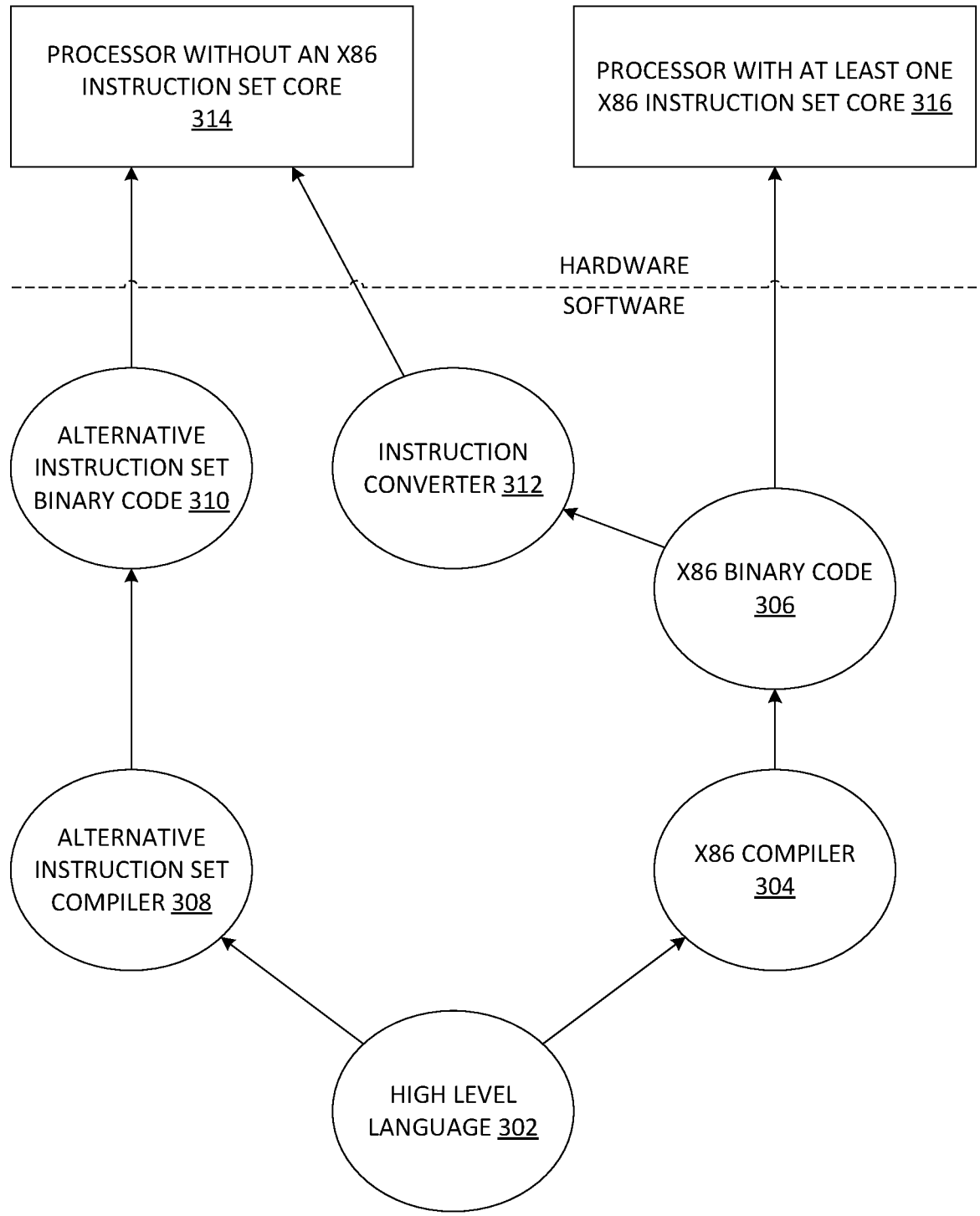
FIG. 13 is a block diagram contrasting the use of a software instruction converter to convert binary instructions in a source instruction set to binary instructions in a target instruction set according to embodiments.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 302 may be compiled using an x86 compiler 304 to generate x86 binary code 306 that may be natively executed by a processor with at least one x86 instruction set core 316. The processor with at least one x86 instruction set core 316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 304 represents a compiler that is operable to generate x86 binary code 306 (e.g., object code) that can, with or without additional linkage processing, be executed on the processor with at least one x86 instruction set core 316. Similarly, FIG. 13 shows the program in the high level language 302 may be compiled using an alternative instruction set compiler 308 to generate alternative instruction set binary code 310 that may be natively executed by a processor without at least one x86 instruction set core 314 (e.g., a processor with cores that execute the MIPS instruction set of MIPS Technologies of Sunnyvale, CA and/or that execute the ARM instruction set of ARM Holdings of Sunnyvale, CA). The instruction converter 312 is used to convert the x86 binary code 306 into code that may be natively executed by the processor without an x86 instruction set core 314. This converted code is not likely to be the same as the alternative instruction set binary code 310 because an instruction converter capable of this is difficult to make; however, the converted code will accomplish the general operation and be made up of instructions from the alternative instruction set. Thus, the instruction converter 312 represents software, firmware, hardware, or a combination thereof that, through emulation, simulation or any other process, allows a processor or other electronic device that does not have an x86 instruction set processor or core to execute the x86 binary code 306.

Additional Notes and Examples

Example 1 includes an electronic apparatus, comprising one or more substrates, and a controller coupled to the one or more substrates, the controller including circuitry to control access to persistent media, and manage an endurance of the persistent media based on one or more endurance hints from an external source.

Example 2 includes the apparatus of Example 1, wherein the circuitry is further to delay a write-back to the persistent media based on an endurance hint.

Example 3 includes the apparatus of any of Examples 1 to 2, wherein the circuitry is further to provide an interface to receive the one or more endurance hints from the external source.

Example 4 includes the apparatus of any of Examples 1 to 3, wherein an endurance hint identifies an address range and an access mode.

Example 5 includes the apparatus of Example 4, wherein the circuitry is further to provide relatively more priority to buffer access requests to the address range identified by the endurance hint.

Example 6 includes the apparatus of any of Examples 4 to 5, wherein the circuitry is further to provide relatively more priority to cache lines that are pending to be flushed that belong to the address range identified by the endurance hint.

Example 7 includes the apparatus of any of Examples 4 to 6, wherein the circuitry is further to host the address range identified by the endurance hint on a scratchpad memory.

Example 8 includes an electronic system, comprising a processor, a tiered memory that includes one or more tiers of persistent media, and a controller communicatively coupled to the processor and the tiered memory, the controller including first circuitry to control access to the tiered memory, and provide one or more endurance hints to the one or more tiers of persistent media.

Example 9 includes the system of Example 8, wherein the endurance hint identifies an address range and an access mode.

Example 10 includes the system of Example 9, wherein at least one tier of the one or more tiers of persistent media includes second circuitry to manage an endurance of the at least one tier based on the address range and the access mode identified by the endurance hint.

Example 11 includes the system of Example 10, wherein the second circuitry is further to delay a write-back to media at the address range identified by the endurance hint.

Example 12 includes the system of any of Examples 8 to 11, wherein the processor is further to determine an endurance hint for the one or more tiers of persistent media.

Example 13 includes the system of Example 12, wherein the processor is further to determine the endurance hint based on an endurance-hint instruction.

Example 14 includes the system of any of Examples 8 to 13, wherein the first circuitry is further to monitor memory traffic for the tiered memory, and determine an endurance hint for the one or more tiers of persistent media based on an analysis of the monitored memory traffic.

Example 15 includes a method of controlling memory, comprising controlling access to persistent media, and managing an endurance of the persistent media based on one or more endurance hints from an external source.

Example 16 includes the method of Example 15, further comprising delaying a write-back to the persistent media based on an endurance hint.

Example 17 includes the method of any of Examples 15 to 16, further comprising providing an interface to receive the one or more endurance hints from the external source.

Example 18 includes the method of any of Examples 15 to 17, wherein an endurance hint identifies an address range and an access mode.

Example 19 includes the method of Example 18, further comprising providing relatively more priority to buffer access requests to the address range identified by the endurance hint.

Example 20 includes the method of any of Examples 18 to 19, further comprising providing relatively more priority to cache lines that are pending to be flushed that belong to the address range identified by the endurance hint.

Example 21 includes the method of any of Examples 18 to 20, further comprising hosting the address range identified by the endurance hint on a scratchpad memory.

Example 22 includes at least one non-transitory machine readable medium comprising a plurality of instructions that, in response to being executed on a computing device, cause the computing device to control access to persistent media, and manage an endurance of the persistent media based on one or more endurance hints from an external source.

Example 23 includes the at least one non-transitory machine readable medium of Example 22, comprising a plurality of further instructions that, in response to being executed on the computing device, cause the computing device to delay a write-back to the persistent media based on an endurance hint.

Example 24 includes the at least one non-transitory machine readable medium of any of Examples 22 to 23, comprising a plurality of further instructions that, in response to being executed on the computing device, cause the computing device to provide an interface to receive the one or more endurance hints from the external source.

Example 25 includes the at least one non-transitory machine readable medium of any of Examples 22 to 24, wherein an endurance hint identifies an address range and an access mode.

Example 26 includes the at least one non-transitory machine readable medium of Example 25, comprising a plurality of further instructions that, in response to being executed on the computing device, cause the computing device to provide relatively more priority to buffer access requests to the address range identified by the endurance hint.

Example 27 includes the at least one non-transitory machine readable medium of any of Examples 25 to 26, comprising a plurality of further instructions that, in response to being executed on the computing device, cause the computing device to provide relatively more priority to cache lines that are pending to be flushed that belong to the address range identified by the endurance hint.

Example 28 includes the at least one non-transitory machine readable medium of any of Examples 25 to 28, comprising a plurality of further instructions that, in response to being executed on the computing device, cause the computing device to host the address range identified by the endurance hint on a scratchpad memory.

Example 29 includes a memory controller apparatus, comprising means for controlling access to persistent media, and means for managing an endurance of the persistent media based on one or more endurance hints from an external source.

Example 30 includes the apparatus of Example 29, further comprising means for delaying a write-back to the persistent media based on an endurance hint.

Example 31 includes the apparatus of any of Examples 29 to 30, further comprising means for providing an interface to receive the one or more endurance hints from the external source.

Example 32 includes the apparatus of any of Examples 29 to 31, wherein an endurance hint identifies an address range and an access mode.

Example 33 includes the apparatus of Example 32, further comprising means for providing relatively more priority to buffer access requests to the address range identified by the endurance hint.

Example 34 includes the apparatus of any of Examples 32 to 33, further comprising means for providing relatively more priority to cache lines that are pending to be flushed that belong to the address range identified by the endurance hint.

Example 35 includes the apparatus of any of Examples 32 to 34, further comprising means for hosting the address range identified by the endurance hint on a scratchpad memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
a controller coupled to the one or more substrates, the controller including circuitry to:
control access to a persistent media; and
manage an endurance of the persistent media based on one or more endurance hints from a processor;
wherein:
the one or more endurance hints are to be based on an endurance-hint instruction which is to comprise both an identifier of an address range and an identifier of an access mode; and
based on an execution of the endurance-hint instruction with the processor, the circuitry is to register a hint that the address range is to be accessed according to the access mode.

2. The electronic apparatus of claim 1, wherein the circuitry is to:
delay a write-back to the persistent media based on the hint that the address range is to be accessed according to the access mode.

3. The electronic apparatus of claim 1, wherein the circuitry is further to:
provide an interface to receive the one or more endurance hints from the processor.

4. The electronic apparatus of claim 1, wherein:
the endurance-hint instruction is a first endurance-hint instruction; and
based on an execution of a second endurance-hint instruction with the processor, the circuitry is further to deregister the hint that the address range is to be accessed according to the access mode.

5. The electronic apparatus of claim 1, wherein the circuitry to manage the endurance of the persistent media based on the one or more endurance hints comprises the circuitry to:
provide relatively more priority to buffer access requests to the address range identified by the endurance hint.

6. The electronic apparatus of claim 1, wherein the circuitry to manage the endurance of the persistent media based on the one or more endurance hints comprises the circuitry to:
provide relatively more priority to cache lines that are pending to be flushed that belong to the address range identified by the endurance hint.

7. The electronic apparatus of claim 1, wherein the circuitry to manage the endurance of the persistent media based on the one or more endurance hints comprises the circuitry to:
host the address range identified by the endurance hint on a scratchpad memory.

8. An electronic system, comprising:
a processor to perform an execution of an endurance-hint instruction which is to comprise both an identifier of an address range and an identifier of an access mode;
a tiered memory that includes one or more tiers of a persistent media; and
a controller communicatively coupled to the processor and the tiered memory, the controller including first circuitry to:
control access to the tiered memory; and
provide one or more endurance hints to the one or more tiers of the persistent media;
wherein:
the one or more endurance hints are to be based on the execution of the endurance-hint instruction; and
based on the execution of the endurance-hint instruction, the first circuitry is to register a hint that the address range is to be accessed according to the access mode.

9. The electronic system of claim 8, wherein:
the endurance-hint instruction is a first endurance-hint instruction; and
based on an execution of a second endurance-hint instruction with the processor, the first circuitry is further to deregister the hint that the address range is to be accessed according to the access mode.

10. The electronic system of claim 9, wherein at least one tier of the one or more tiers of the persistent media includes second circuitry to:
manage an endurance of the at least one tier based on the address range and the access mode identified by the hint that the address range is to be accessed according to the access mode.

11. The electronic system of claim 10, wherein the second circuitry to manage the endurance of the at least one tier comprises the second circuitry to:
delay a write-back to media at the address range identified by the hint.

12. The electronic system of claim 8, wherein the first circuitry is further to:
monitor memory traffic for the tiered memory; and
determine an endurance hint for the one or more tiers of the persistent media based on an analysis of the monitored memory traffic.

13. A method of controlling memory, the method comprising:
controlling access to a persistent media; and
managing an endurance of the persistent media based on one or more endurance hints from a processor;
wherein:
the one or more endurance hints are based on an endurance-hint instruction which comprises both an identifier of an address range and an identifier of an access mode; and based on an execution of the endurance-hint instruction with the processor, a controller coupled to the processor registers a hint that the address range is to be accessed according to the access mode.

14. The method of claim 13, further comprising:

delaying a write-back to the persistent media based on the hint that the address range is to be accessed according to the access mode.

15. The method of claim 13, further comprising:

providing an interface to receive the one or more endurance hints from the processor.

16. The method of claim 13, wherein:

the endurance-hint instruction is a first endurance-hint instruction; and based on an execution of a second endurance-hint instruction with the processor, the controller further deregisters the hint that the address range is to be accessed according to the access mode.

17. The method of claim 16, wherein managing the endurance of the persistent media based on the one or more endurance hints comprises:

providing relatively more priority to buffer access requests to the address range identified by the hint the address range is to be accessed according to the access mode.

18. The method of claim 16, further comprising:

hosting the address range identified by the hint on a scratchpad memory.

* * * * *